US010132524B2

(12) United States Patent
Ellsworth et al.

(10) Patent No.: US 10,132,524 B2
(45) Date of Patent: Nov. 20, 2018

(54) APPARATUS FOR DRAINAGE OF CONDENSATE IN MIXING DUCT EXPOSED TO SUB-FREEZING AIR

(71) Applicant: The Boeing Company, Chicago, IL (US)

(72) Inventors: Scott P. Ellsworth, Everett, WA (US); Sonny K. Nguyen, Mill Creek, WA (US); David W. Olson, Gold Bar, WA (US)

(73) Assignee: The Boeing Company, Chicago, IL (US)

( * ) Notice: Subject to any disclaimer, the term of this patent is extended or adjusted under 35 U.S.C. 154(b) by 454 days.

(21) Appl. No.: 14/747,938

(22) Filed: Jun. 23, 2015

(65) Prior Publication Data

US 2016/0377316 A1 Dec. 29, 2016

(51) Int. Cl.
*F24F 13/22* (2006.01)
*F24F 13/04* (2006.01)
*F24F 13/02* (2006.01)
*F24F 13/30* (2006.01)
*F24F 7/06* (2006.01)
*B64D 13/06* (2006.01)

(52) U.S. Cl.
CPC ............ *F24F 13/222* (2013.01); *B64D 13/06* (2013.01); *F24F 7/06* (2013.01); *F24F 13/0209* (2013.01); *F24F 13/04* (2013.01); *F24F 13/30* (2013.01)

(58) Field of Classification Search
CPC ...... F24F 13/0209; F24F 13/04; F24F 13/222; F24F 13/30; F24F 7/06; B64D 13/06
See application file for complete search history.

(56) References Cited

U.S. PATENT DOCUMENTS

| | | | | | |
|---|---|---|---|---|---|
| 2,963,783 | A | * | 12/1960 | Field ...................... | B21C 37/28 285/183 |
| 3,134,259 | A | * | 5/1964 | Hallmarken ........... | G01K 13/02 374/28 |
| 3,596,936 | A | * | 8/1971 | Dieckmann ........... | F16L 37/008 285/136.1 |
| 4,123,093 | A | * | 10/1978 | Newland ............... | F16L 37/008 285/189 |
| 4,147,382 | A | * | 4/1979 | Wachter ............... | F24F 13/0209 285/189 |
| 4,294,476 | A | * | 10/1981 | Nash .................... | F24F 13/0209 285/189 |
| 5,314,212 | A | * | 5/1994 | Sanders ................ | F16L 41/082 285/189 |
| 5,393,106 | A | * | 2/1995 | Schroeder ............. | F16L 41/082 285/136.1 |

(Continued)

*Primary Examiner* — Filip Zec
(74) *Attorney, Agent, or Firm* — McDonnell Boehnen Hulbert & Berghoff LLP

(57) ABSTRACT

An apparatus and system and method for mixing airflow and draining condensate in a duct exposed to sub-freezing air are disclosed. An example mixing duct apparatus includes a recirculation duct and a pack duct having a first end and a second end. The first end of the pack duct is coupled to a side of the recirculation duct. The pack duct has a lip that extends into an airflow passage defined by the recirculation duct. This lip defines a flow channel for condensate in the recirculation duct to flow beneath sub-freezing air entering the recirculation duct from the pack duct to decrease ice build-up in the pack duct.

19 Claims, 6 Drawing Sheets

(56) References Cited

U.S. PATENT DOCUMENTS

| | | | | |
|---|---|---|---|---|
| 5,538,293 | A * | 7/1996 | Kolt | F16L 37/008 285/189 |
| 6,814,051 | B2 * | 11/2004 | Suzuki | F02D 9/08 123/337 |
| 7,354,244 | B2 * | 4/2008 | Hasbargen | F23L 17/005 415/212.1 |
| 7,543,458 | B1 * | 6/2009 | Wurth | B64D 13/06 62/272 |
| 8,205,604 | B2 * | 6/2012 | Velosa | F01M 13/022 123/184.21 |
| 8,683,821 | B2 * | 4/2014 | Volk | B01D 29/15 62/291 |
| 9,316,183 | B2 * | 4/2016 | Rollins | F02M 25/0836 |
| 2002/0002968 | A1 * | 1/2002 | Gillespie | F02B 77/10 123/572 |

* cited by examiner

APPARATUS FOR DRAINAGE OF CONDENSATE IN MIXING DUCT EXPOSED TO SUB-FREEZING AIR

FIELD

The disclosure is related to a ducted air system and, more particularly, to a ducted air system for mixing air from an air conditioning pack with recirculated air from an aircraft cabin.

BACKGROUND

In known aircraft cooling systems, conditioned supply air to an aircraft cabin is recirculated and mixed with cooled sub-freezing air from an air conditioning pack via a mix manifold and ductwork system. The recirculated air may be passed through a heat exchanger that cools and condenses moisture from the air to a recirculation duct and on to the mix manifold. The recirculation duct may be tied into the top of a pack duct that directs sub-freezing air from an air conditioning pack to the mix manifold. In these systems, the condensate from the recirculation duct may drain into the pack duct and freeze. As the frozen condensate builds in the pack duct, air flow may become obstructed.

SUMMARY

The disclosed embodiments provide a mixing duct apparatus and system for mixing airflow and draining condensate in a recirculation duct exposed to sub-freezing air.

In a first aspect, an apparatus is provided that includes a recirculation duct and a pack duct that has a first end and a second end arranged such that the first end of the pack duct is coupled to a side of the recirculation duct. The pack duct further has a lip that extends into an airflow passage defined by the recirculation duct.

A second aspect is directed to a system that includes a mixing manifold comprising a cylindrical chamber. A recirculation duct has a first end and a second end and is arranged such that the first end of the recirculation duct is coupled to the mixing manifold. The system also includes a pack duct that has a first end and a second end and arranged such that the first end of the pack duct is coupled to a side of the recirculation duct, wherein the pack duct has a lip that extends into an airflow passaged defined by the recirculation duct.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Presently preferred embodiments are described below in conjunction with the appended figures, wherein like reference numerals refer to like elements in the various figures, and wherein.

Corresponding parts are marked with the same reference symbols in all figures.

Figure 1:
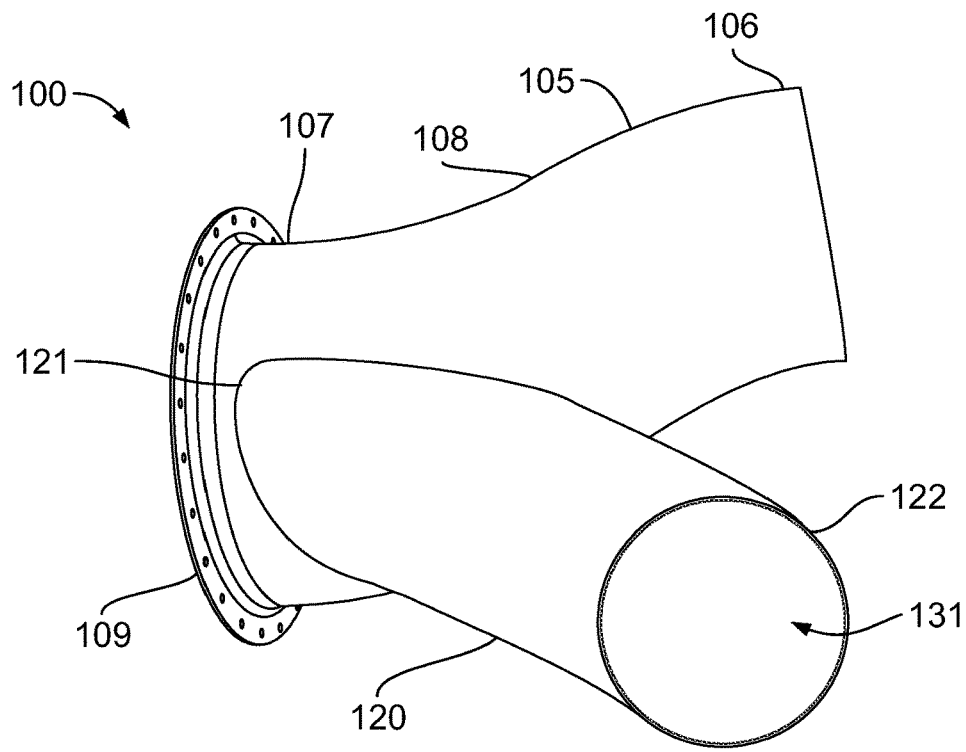
FIG. 1 is a diagrammatic representation of a first side perspective view of a mixing duct apparatus, according to one example embodiment.

The drawings are provided for the purpose of illustrating example embodiments, but it is understood that the inventions are not limited to the arrangements and instrumentalities shown in the drawings.

DETAILED DESCRIPTION

Figure 2:
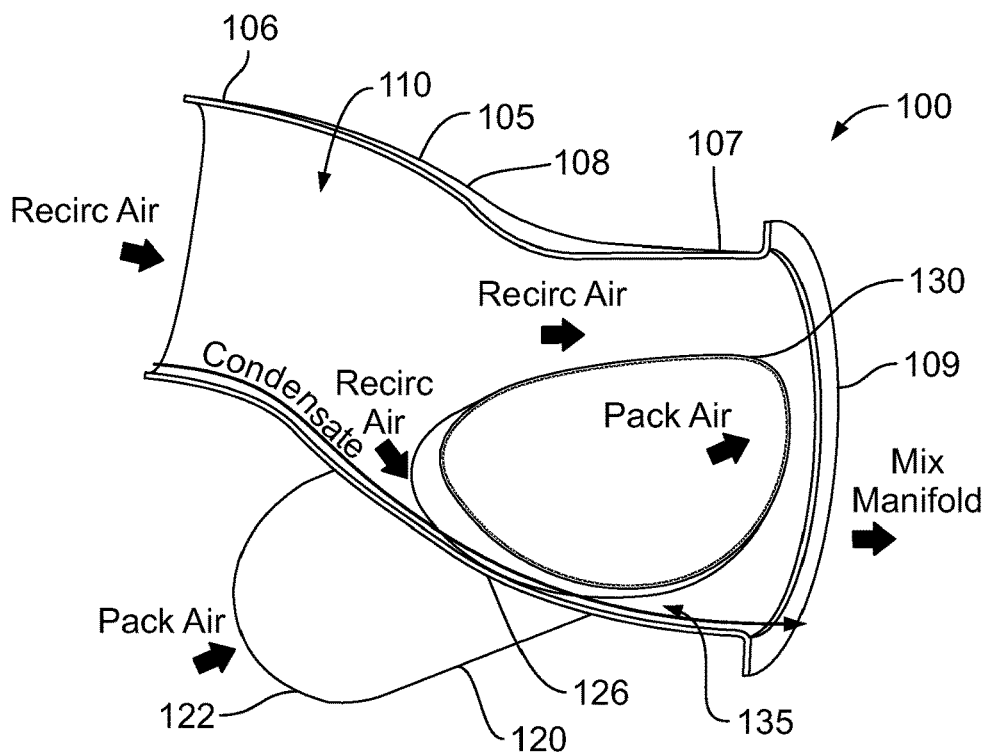
FIG. 2 is a diagrammatic representation of a cross-sectional side view of a recirculation duct and an end view of a pack duct of the mixing duct apparatus, according to the embodiment of FIG. 1.
Figure 7:
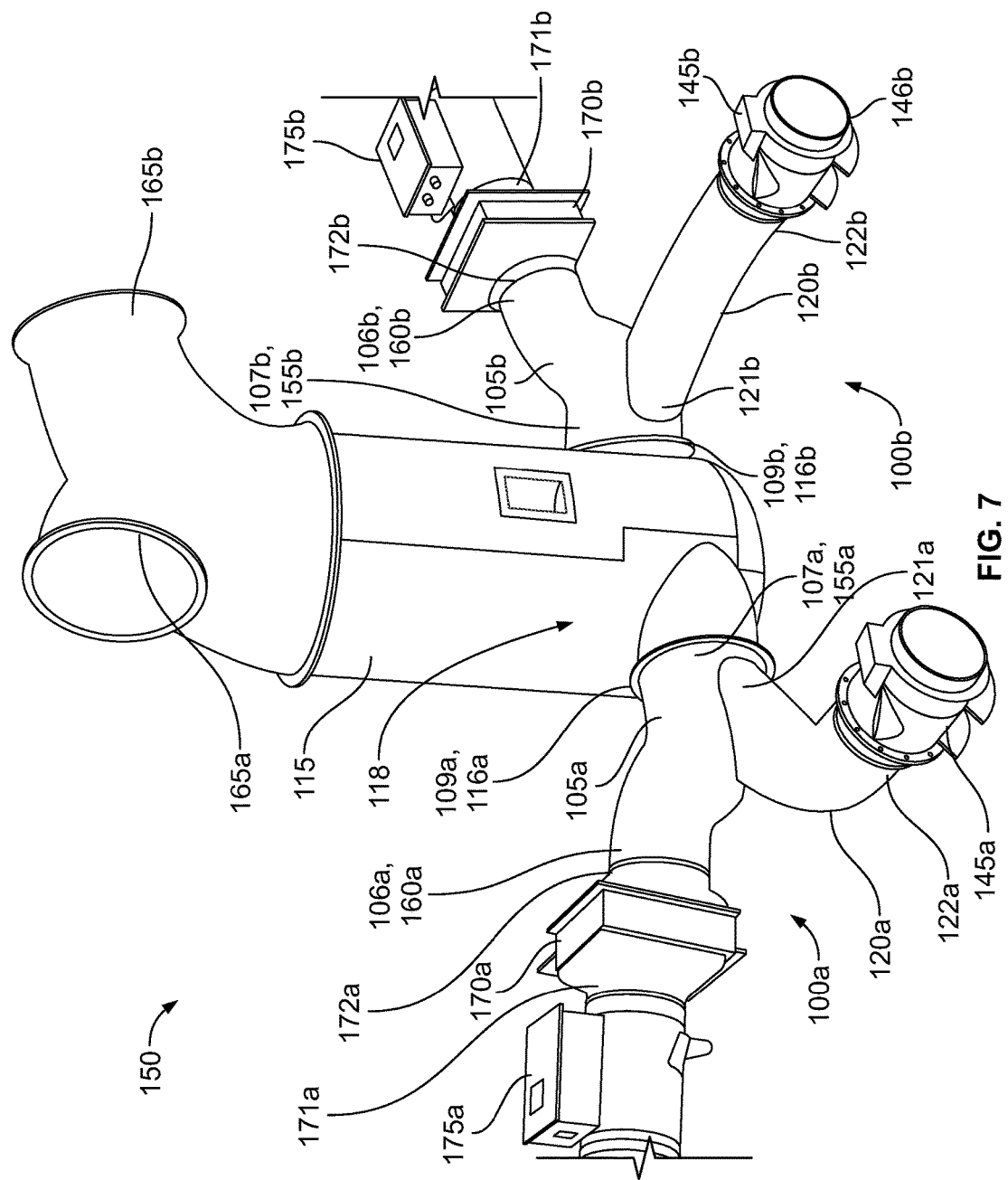
FIG. 7 is a diagrammatic representation of a mix manifold recirculation system, according to one example embodiment.

FIG. 1 depicts a mixing duct apparatus 100 having a recirculation duct 105 defining an airflow passage 110, shown in cross-section in FIG. 2. In one embodiment, the recirculation duct 105 may define an upper portion 106 and a lower portion 107 coupled together by a downward sloping transition portion 108. In an alternative embodiment, the upper portion 106 and the lower portion 107 may share a common longitudinal axis with the downward sloping transition portion 108 of the recirculation duct 105 such that the recirculation duct 105 is straight and has a downward angled slope relative to a mix manifold 115. In one embodiment, the lower portion 107 may be coupled to a flange 109 for mating with a corresponding flange 116 coupled to and extending from the mix manifold 115, as shown in FIG. 7.

The mixing duct apparatus 100 also includes a pack duct 120 having a first end 121 and a second end 122 and arranged such that the first end 121 of the pack duct 120 is coupled to a side 125 of the recirculation duct 105. In addition, the pack duct 120 has a lip 130 that extends into the airflow passage 110 defined by the recirculation duct 105. In one embodiment, the lip 130 of the pack duct 120 extends at least ¼ inch into the airflow passage 110, and, in various other embodiments, the lip 130 of the pack duct 120 extends from ¼ inch to 1 inch into the airflow passage 110. This arrangement may beneficially prevent condensate that flows along the walls of the recirculation duct 105 from entering the pack duct 120 and thereby prevents condensate from freezing in the pack duct 120 and from obstructing airflow. In addition to shielding the pack duct 120, the dimensions of the lip 130 are contemplated to minimize any effect on mixing of the airflow from the pack duct 120 with the airflow of the recirculation duct 105. In one embodiment, the mixing duct apparatus 100 is configured to operate with an aircraft cabin humidity that ranges from about 125 grs/lbm to about 200 grs/lbm that in turn corresponds to a condensate flow rate that ranges from about 6 GPH to about 12 GPH, respectively.

In one embodiment, the lip 130 of the pack duct 120 is arranged above a bottom surface 126 of the recirculation duct 105. This arrangement may provide a flow channel 135 for condensate in the recirculation duct 105 to travel beneath the lip 130 and ultimately to the mixing manifold 115 thereby avoiding the sub-freezing airflow entering into the recirculation duct 105 from the pack duct 120. In a further embodiment, the lip 130 of the pack duct 120 may be arranged equidistant between the bottom surface 126 and a top surface 127 of the recirculation duct 105. This arrangement may permit enhanced mixing of the airflow from the pack duct 120 with the airflow in the recirculation duct 105 by directing airflow over both the top and bottom of the lip 130. In still another embodiment, the lip 130 of the pack duct 120 may have an aerodynamic profile to further enhance airflow. The lip 130 preferably has a shared cross-section with the pack duct 120 and has a common interior surface 131 with the pack duct 120 such that there are no edges, ridges or separation between the lip 130 and the pack duct 120. This arrangement may minimize impact on airflow in the pack duct 120 such that air does not separate from the interior wall 131 of the pack duct 120 until the air exits into the recirculation duct 105. In addition, airflow attached to the wall of the pack duct 120 may have the propensity to preclude condensate that may flow along the walls of recirculation duct 105 from entering into pack duct 120.

Figure 6:
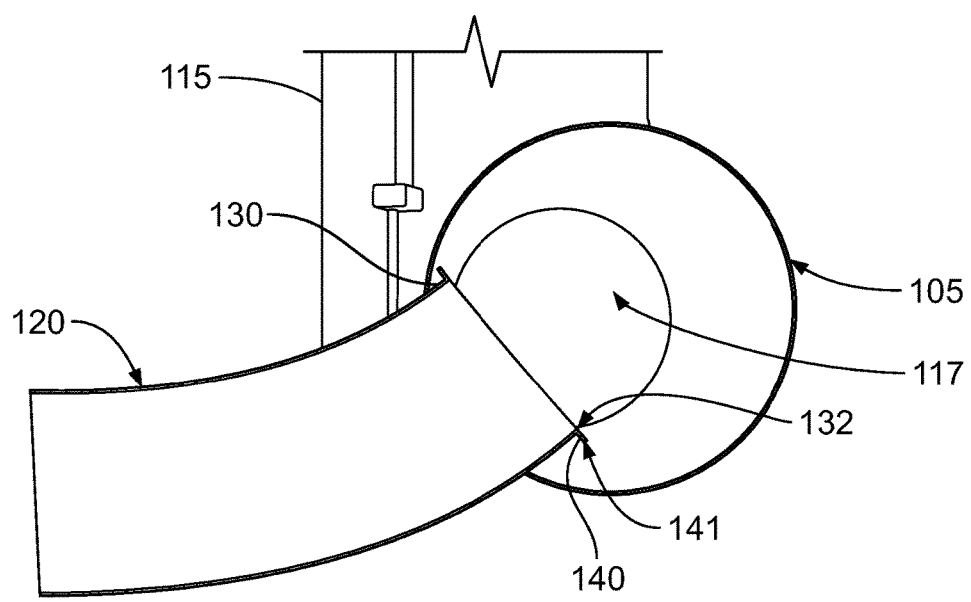
FIG. 6 is a diagrammatic representation of a cross-sectional end view of a recirculation duct and a cross-sectional side view of a pack duct of a mixing apparatus, according to one example embodiment.

In a further embodiment shown in FIG. 6, a flange 140 may be coupled to and radially extend from the lip 130 of the pack duct 120. In a further embodiment, the flange 140 may extend from the end 132 of the lip 130 at a 90 degree angle. In operation, the water droplets may move from the end 132 of the lip 130 to the outer edge 141 of the flange 140 and out of the path of sub-freezing air flowing through the pack duct 120.

Figure 3:
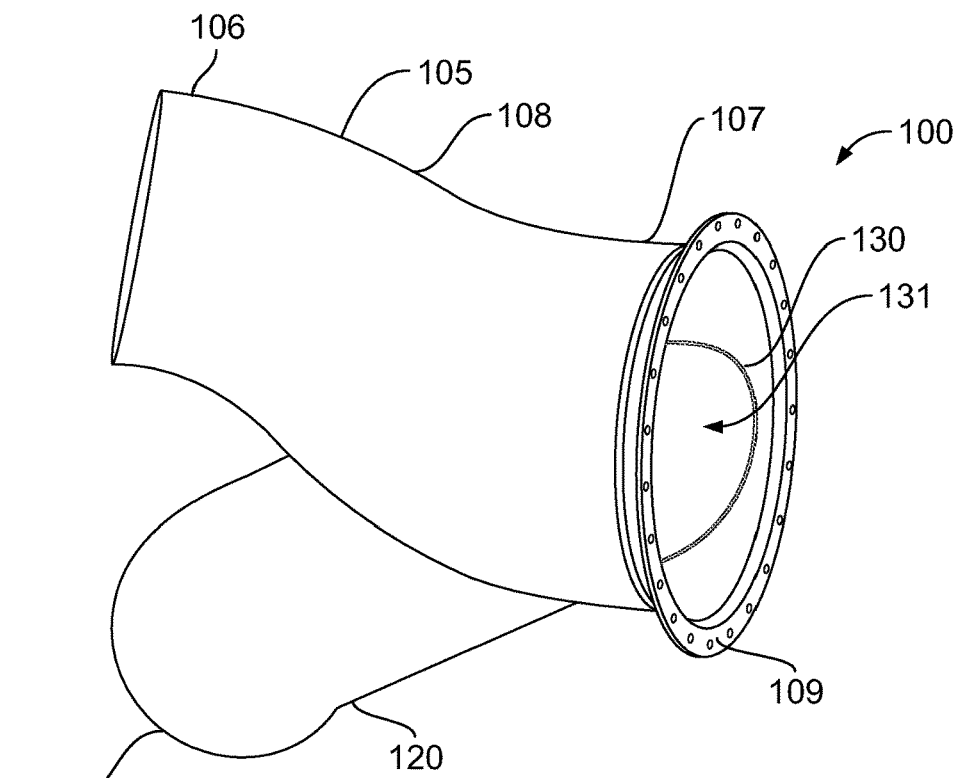
FIG. 3 is a diagrammatic representation of a second side perspective view of the mixing duct apparatus, according to the embodiment of FIG. 1.
Figure 4:
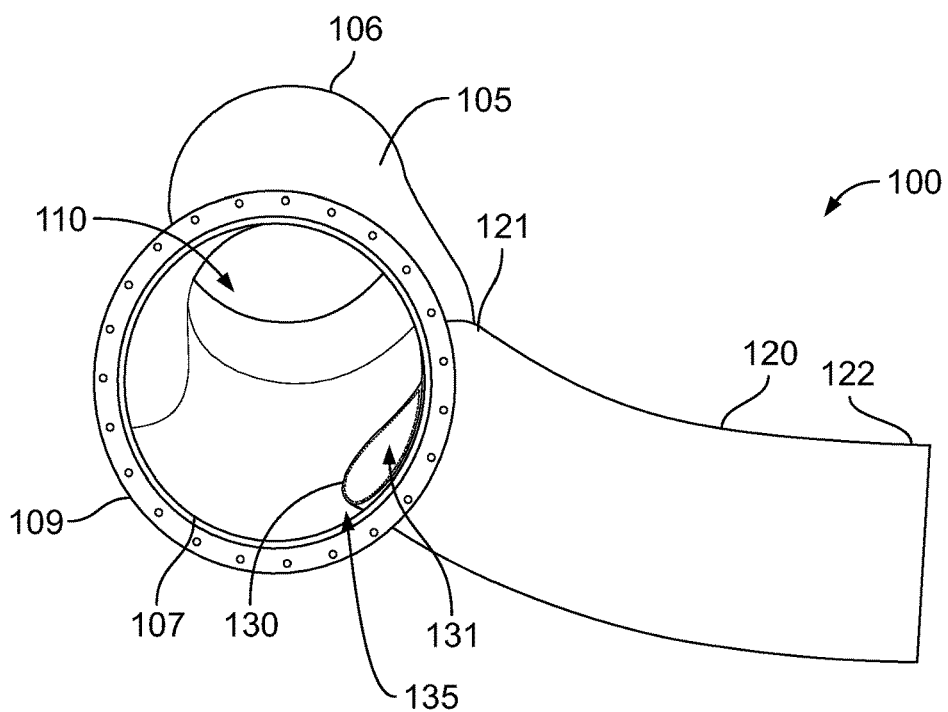
FIG. 4 is a diagrammatic representation of a first end perspective view of the mixing apparatus, according to the embodiment of FIG. 1.
Figure 5:
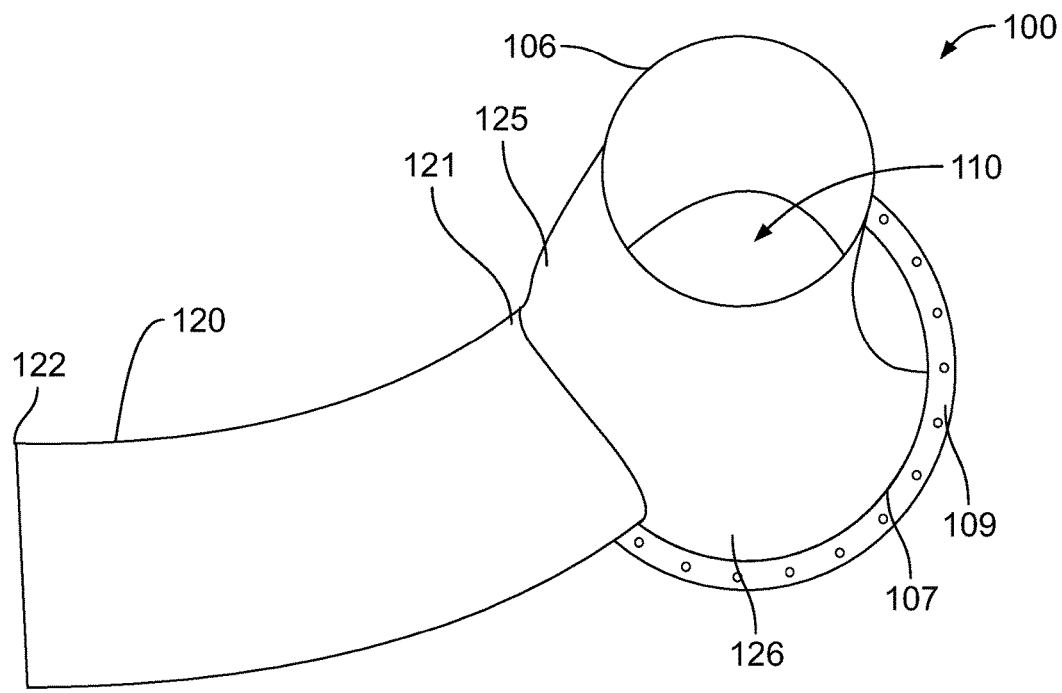
FIG. 5 is a diagrammatic representation of a second end perspective view of the mixing apparatus, according to the embodiment of FIG. 1.

In another embodiment, the pack duct lip 130 and a portion of the pack duct 120 that is coupled to the recirculation duct 105 may slope downward and away from the recirculation duct 105, best seen in FIGS. 3-5. In addition, as shown in FIG. 7, an air check valve 145a,b may be coupled to the second end 122 of the pack duct 120 in one embodiment, and the air check valve 145a,b may, in turn, define a drainage opening 146a,b. This arrangement may permit any condensate that may enter the pack duct 120 to drain when the mixing duct apparatus 100 is not in use.

Referring to FIGS. 6 and 7, a system 150 is provided including a mixing manifold 115 comprising a cylindrical chamber 117 that is arranged to receive airflow from at least one mixing duct apparatus 100a described above with respect to FIGS. 1-6. In one embodiment, the mixing manifold 115 may also include a drainage outlet (not shown) arranged in the base to receive and drain condensate from the mixing duct apparatus 100a.

As noted above, the system 150 also includes a recirculation duct 105a that has a lower portion 107a with a first end 155a that is coupled to the mixing manifold 115. As described above, the lower portion 107a may be coupled to a flange 109a for mating with a corresponding flange 116a coupled to and extending from the mixing manifold 115. In one embodiment, the recirculation duct 105a may be coupled to a lower half of a sidewall 118 of the mixing manifold 115 to permit the airflow to be directed through the cylindrical chamber 117 of the mixing manifold 115 to one or more outlet openings 165a,b to additional ducts for delivery to an aircraft cabin, for example. The recirculation duct 105a may also be arranged relative to the mixing manifold 115 such that airflow from the airflow passage 110 of the recirculation duct 105a is directed tangentially into the cylindrical chamber 117 of the mixing manifold 115.

The system 150 further includes a pack duct 120a that has a first end 121a and a second end 122a and arranged such that the first end 121a of the pack duct 120a is coupled to a side 125 of the recirculation duct 105. As described above with respect to the mixing apparatus 100, the pack duct 120a has a lip 130 that extends into an airflow passage 110 defined by the recirculation duct 105a.

In one embodiment, the system 150 may include a heat exchanger 170a having an inlet 171a and an outlet 172a. The heat exchanger 170a may be arranged such that the outlet 172a is coupled to the second end 160a of the upper portion 106a of the recirculation duct 105a. The heat exchanger 170a may be configured to cool air received, for example, from the flight deck or aircraft cabin and, as a result, condensate may form. This condensate may then flow into the recirculation duct 105a under the force of gravity and/or due to airflow through the system 150.

In another embodiment, the system 150 may also include a fan 175a that is coupled to the inlet 171a of the heat exchanger 170a. In operation, the fan 175a may draw air from the flight deck or aircraft cabin and direct this air through the heat exchanger 170a to the recirculation duct 105a and into the mixing manifold 115.

In one embodiment, the system 150 may further include a second mixing duct apparatus 100b having a second recirculation duct 105b that has a lower portion 107b with a first end 155b that is coupled to the mixing manifold 115 opposite to the other mixing duct apparatus 100a. This second mixing duct apparatus 100b may receive air from another area of the flight deck or cabin for cooling and recirculation. In one embodiment, the recirculation duct 105b may also be coupled to a lower half of a sidewall 118 of the mix manifold 115. As described above, the lower portion 107b may be coupled to a flange 109b for mating with a corresponding flange 116b coupled to and extending from the mix manifold 115. In various embodiments, the second recirculation duct 105b may be arranged relative to the mixing manifold 115 such that airflow from the airflow passage 110b of the second recirculation duct 105b is directed tangentially into the mixing manifold 115, similar to the other recirculation duct 100a.

The system 150 may also include a second pack duct 120b having a first end 121b and a second end 122b. As described above, the first end 121b of the second pack duct 120b may be coupled to a side 125 of the second recirculation duct 105b and the second pack duct 120b may have a lip 130 that extends into an airflow passage 110 defined by the second recirculation duct 105b.

In yet another embodiment, the system 150 may also include a second heat exchanger 170b having an inlet 171b and an outlet 172b. In one embodiment, the outlet 172b of the second heat exchanger 170b may be coupled to the upper portion 106b of the second recirculation duct 100b at the second end 160b. In a further embodiment, the system may also include a second fan 175b coupled to the inlet 171b of the second heat exchanger 170b. The second heat exchanger 170b and the second fan 175b may operate as described above with respect to the other mixing duct apparatus 100a.

In exemplary embodiments, the fans 175a,b and the heat exchangers 170a,b may be elevated relative to the mixing duct apparatus 100a,b such that condensate drains downward toward the mixing duct apparatus 115, which in turn has a recirculation duct 105 that may be angled downward relative to the mixing manifold 115.

In other embodiments, the system 150 may include a temperature controller (not shown) that may be coupled to sensors in the mix manifold 115 and configured to maintain a minimum temperature of 35 degrees Fahrenheit.

Figure 8:
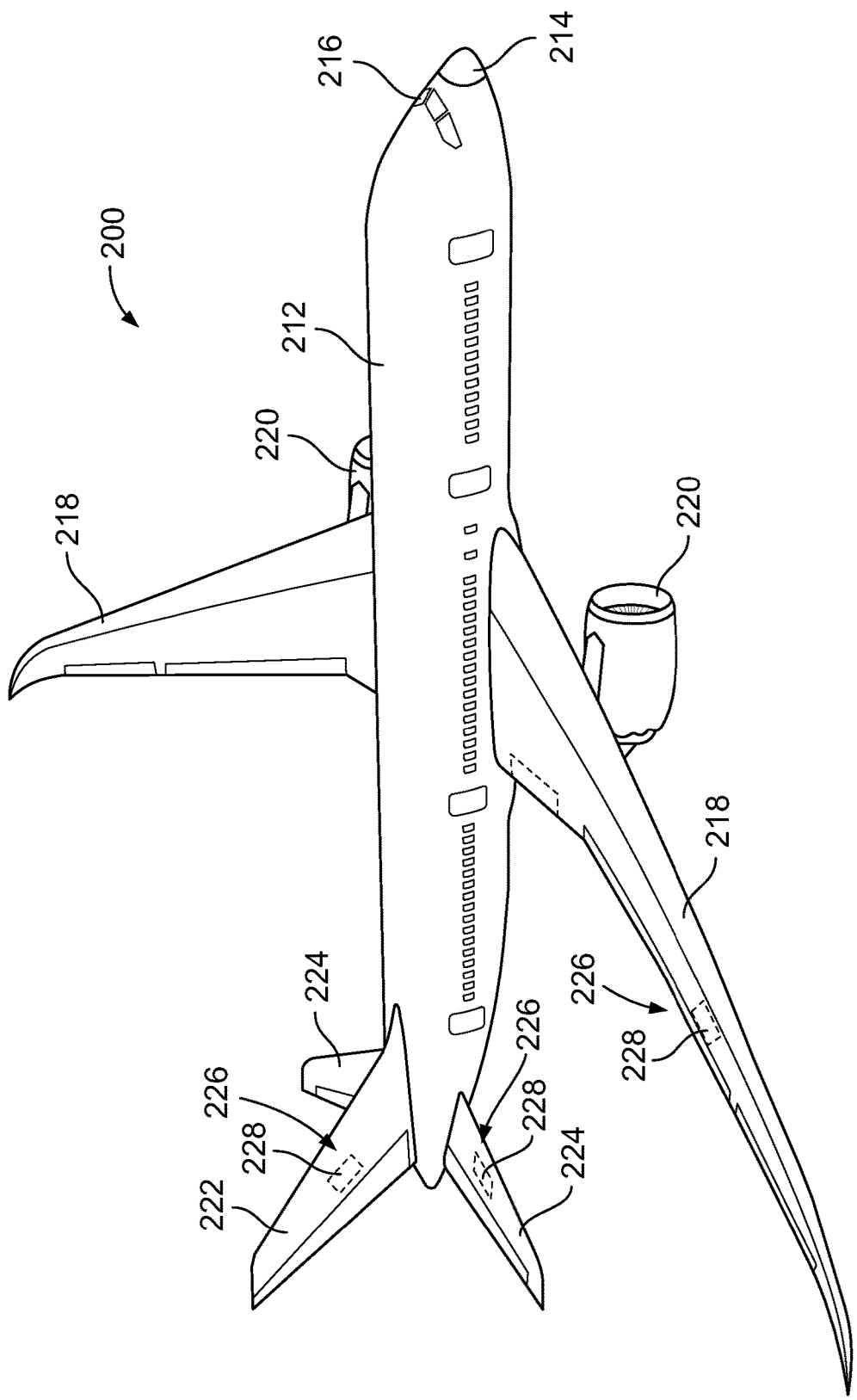
FIG. 8 is a diagrammatic representation of a perspective view of an aircraft that may incorporate a mixing apparatus and/or a mix manifold recirculation system in accordance with one or more embodiments disclosed herein.

FIG. 8 is an illustration of a perspective view of an aircraft 200 that may incorporate the mixing apparatus and mix manifold recirculation systems according one or more of the embodiments of the present disclosure. As shown in FIG. 8, the aircraft 200 comprises a fuselage 212, a nose 214, a cockpit 216, wings 218 operatively coupled to the fuselage 212, one or more propulsion units 220, a tail vertical stabilizer 222, and one or more tail horizontal stabilizers 224. Although the aircraft 200 shown in FIG. 8 is generally representative of a commercial passenger aircraft, the mixing apparatus and mix manifold recirculation systems, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles utilizing the mixing apparatus and mix manifold recirculation systems as disclosed herein.

Figure 9:
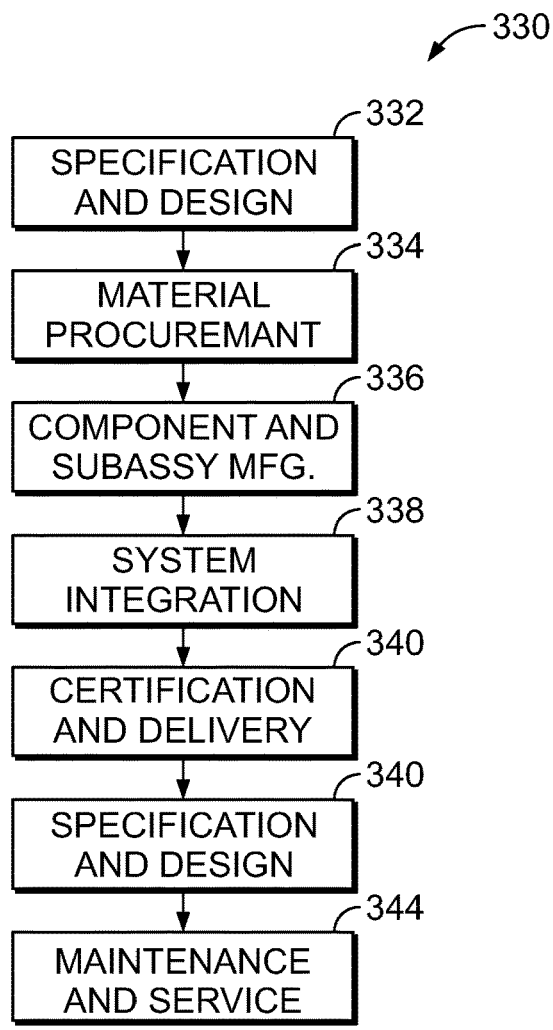
FIG. 9 is a flow diagram of an embodiment of an aircraft production and service method of the disclosure.
Figure 10:
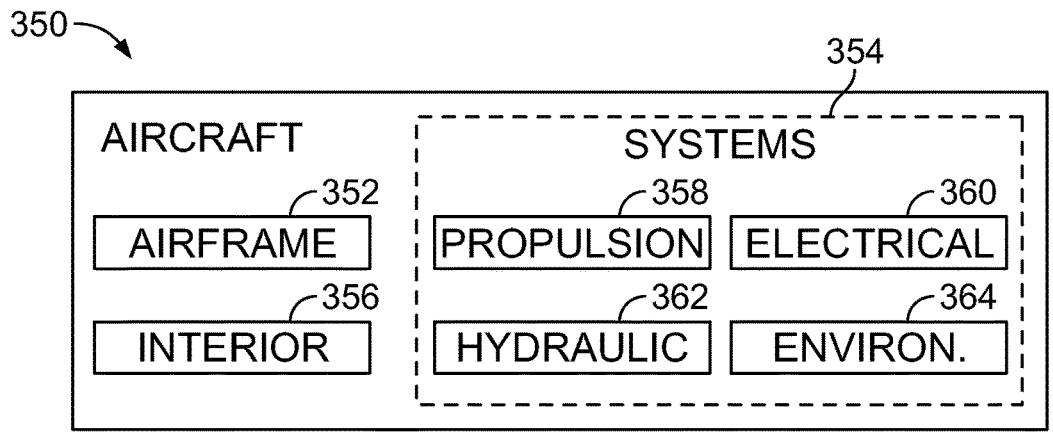
FIG. 10 is a functional block diagram of an aircraft.

Embodiments of the disclosure may find use in a variety of potential applications, particularly in the transportation industry, including for example, aerospace, marine, automotive applications and other application where the mixing apparatus and mix manifold recirculation systems may be used. Therefore, referring now to FIGS. 9 and 10, embodiments of the disclosure may be used in the context of an aircraft manufacturing and service method 330 as shown in FIG. 9 and an aircraft 350 as shown in FIG. 10. Aircraft applications of the disclosed embodiments may include, for example, without limitation, the design and fabrication of mixing apparatus and mix manifold recirculation systems as disclosed herein.

During pre-production, exemplary method 330 may include specification and design 332 of the aircraft 350 and material procurement 334. As just one example, the specification and design of the aircraft-related air recirculation system and ductwork that may use the mixing apparatus and/or the mix manifold recirculation system disclosed herein, may be determined at this step. As just one example, at this step, it may be determined that a specific mix manifold recirculation system and arrangements for the mixing apparatus are needed.

During production, component and subassembly manufacturing 336 and system integration 338 of the aircraft 350 takes place. As explained in greater detail above, FIGS. 1-7 illustrate preferred embodiments of mixing apparatus and/or the mix manifold recirculation system for draining condensate in a recirculation duct exposed to sub-freezing air in accordance with two aspects of the present disclosure. After such a component and subassembly manufacturing step, the aircraft 350 may go through certification and delivery 340 in order to be placed in service 342. While in service by a customer, the aircraft 350 is scheduled for routine maintenance and service 344, which may also include modification, reconfiguration, refurbishment, and so on.

Each of the process steps of exemplary method 330 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 350 produced by exemplary method 330 may include an airframe 352 with a plurality of high-level systems 354 and an interior 356. Examples of high-level systems 354 may include one or more of a propulsion system 358, an electrical system 360, a hydraulic system 362, and an environmental system 364. Any number of other systems may be included. Although an aerospace example is shown, the principles of the disclosure may be applied to other industries, such as the marine and automotive industries.

Apparatus and systems embodied herein may be employed during any one or more of the stages of the aircraft manufacturing and service method 330. For example, components or subassemblies corresponding to production process may be fabricated or manufactured in a manner similar to components or subassemblies produced while the aircraft 350 is in service. Also, one or more apparatus embodiments, system embodiments, or a combination thereof may be utilized during the production stages 332 and 334, for example, by substantially expediting assembly of or reducing the cost of an aircraft 350. Similarly, one or more of apparatus embodiments, system embodiments, or a combination thereof may be utilized while the aircraft 350 is in service, for example and without limitation, to maintenance and service 344.

It is intended that the foregoing detailed description be regarded as illustrative rather than limiting and that it is understood that the following claims, including all equivalents, are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus, comprising:
    a recirculation duct; and
    a pack duct having a first end and a second end, wherein the first end of the pack duct is coupled to a side of the recirculation duct, wherein the pack duct has a lip that extends into an airflow passage defined by the recirculation duct thereby providing a flow channel configured for a condensate in the recirculation duct to travel beneath the lip, wherein the lip of the pack duct has a uniform and shared cross-section with the pack duct and has a common interior surface with the pack duct such that there are no edges, ridges or separation between the lip and the pack duct.

2. The apparatus of claim 1, wherein the recirculation duct defines an upper portion and a lower portion coupled together by a downward sloping transition portion.

3. The apparatus of claim 2, wherein the upper portion and the lower portion share a common longitudinal axis with the downward sloping transition portion of the recirculation duct such that the recirculation duct is straight.

4. The apparatus of claim 1, wherein the lip of the pack duct extends at least ¼ inch into the airflow passage.

5. The apparatus of claim 1, wherein the lip of the pack duct extends from ¼ inch to 1 inch into the airflow passage.

6. The apparatus of claim 1, wherein the lip of the pack duct is arranged above a bottom surface of the recirculation duct.

7. The apparatus of claim 1, wherein the lip of the pack duct is arranged equidistant between a bottom surface and a top surface of the recirculation duct.

8. The apparatus of claim 1, wherein the lip of the pack duct has an aerodynamic profile.

9. The apparatus of claim 1, further comprising:
a flange coupled to and radially extending from a free end of the lip of the pack duct.

10. The apparatus of claim 1, wherein the lip of the pack duct and a portion of the pack duct coupled to the recirculation duct slopes downward and away from the recirculation duct.

11. The apparatus of claim 1, further comprising an air check valve coupled to the second end of pack duct, wherein the air check valve defines a drainage opening.

12. A system, comprising:
a mixing manifold comprising a cylindrical chamber;
a recirculation duct having a first end and a second end, wherein the first end of the recirculation duct is coupled to the mixing manifold; and
a pack duct having a first end and a second end, wherein the first end of the pack duct is coupled to a side of the recirculation duct, wherein the pack duct has a lip that extends into an airflow passage defined by the recirculation duct thereby providing a flow channel configured for a condensate in the recirculation duct to travel beneath the lip, wherein the lip of the pack duct has a uniform and shared cross-section with the pack duct and has a common interior surface with the pack duct such that there are no edges, ridges or separation between the lip and the pack duct.

13. The system of claim 12, further comprising:
a second recirculation duct having a first end and a second end, wherein the first end of the second recirculation duct is coupled to the mixing manifold; and
a second pack duct having a first end and a second end, wherein the first end of the second pack duct is coupled to a side of the second recirculation duct, wherein the second pack duct has a lip that extends into an airflow passage defined by the second recirculation duct.

14. The system of claim 12, wherein the mixing manifold comprises a drainage outlet.

15. The system of claim 12, further comprising:
a heat exchanger having an inlet and an outlet, wherein the outlet of the heat exchanger is coupled to the second end of the recirculation duct.

16. The system of claim 15, further comprising:
a fan coupled to the inlet of the heat exchanger.

17. The system of claim 13, further comprising:
a second heat exchanger having an inlet and an outlet, wherein the outlet of the second heat exchanger is coupled to the second end of the second recirculation duct.

18. The system of claim 17, further comprising:
a second fan coupled to the inlet of the second heat exchanger.

19. The system of claim 13, wherein the recirculation duct is arranged relative to the mixing manifold such that airflow from the airflow passage of the recirculation duct is directed tangentially into the mixing manifold.

* * * * *